United States Patent
Zhou

(10) Patent No.: US 10,310,930 B2
(45) Date of Patent: Jun. 4, 2019

(54) SOLID STATE DISK USING METHOD AND APPARATUS

(71) Applicant: Huawei Technologies Co., Ltd., Shenzhen (CN)

(72) Inventor: Jianhua Zhou, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 15/189,857

(22) Filed: Jun. 22, 2016

(65) Prior Publication Data

US 2016/0299805 A1 Oct. 13, 2016

Related U.S. Application Data

(63) Continuation of application No. PCT/CN2014/081976, filed on Jul. 10, 2014.

(30) Foreign Application Priority Data

Dec. 23, 2013 (CN) .......................... 2013 1 0718063

(51) Int. Cl.
*G06F 11/00* (2006.01)
*G06F 11/07* (2006.01)
(Continued)

(52) U.S. Cl.
CPC .......... *G06F 11/079* (2013.01); *G06F 3/0611* (2013.01); *G06F 3/0659* (2013.01); *G06F 3/0679* (2013.01); *G06F 11/0727* (2013.01); *G06F 11/0757* (2013.01); *G06F 12/0246* (2013.01); *G06F 11/3419* (2013.01);
(Continued)

(58) Field of Classification Search
CPC .............. G06F 11/079; G06F 11/0727; G06F 11/1072; G06F 11/1068; G06F 3/0611; G06F 3/0679
See application file for complete search history.

(56) References Cited

U.S. PATENT DOCUMENTS

2004/0158775 A1 8/2004 Shibuya et al.
2005/0204187 A1* 9/2005 Lee ..................... G06F 12/0246
714/6.13
(Continued)

FOREIGN PATENT DOCUMENTS

CN 1517947 A 8/2004
CN 101477492 A 7/2009
(Continued)

*Primary Examiner* — Philip Guyton
(74) *Attorney, Agent, or Firm* — Leydig, Voit & Mayer, Ltd.

(57) ABSTRACT

A solid state disk using method includes: determining a latency of the data block to-be-operated according to a load balancing table of the solid state disk; determining whether the latency of the data block is greater than a warning value, where the warning value is less than a typical latency, which is a preset latency indicating an operation on a data block in the solid state disk fails; and not performing the operation on the data block if the latency of the data block is greater than the warning value. By using this method, real load balancing from the perspective of physical property is achieved, bad blocks are reduced, use of reserved blocks is reduced, thereby prolonging the service life of the SSD.

12 Claims, 9 Drawing Sheets

(51) Int. Cl.
*G06F 12/02* (2006.01)
*G06F 3/06* (2006.01)
*G06F 11/34* (2006.01)

(52) U.S. Cl.
CPC ........... *G06F 2212/1036* (2013.01); *G06F 2212/214* (2013.01); *G06F 2212/7204* (2013.01); *G06F 2212/7206* (2013.01); *G06F 2212/7211* (2013.01)

(56) References Cited

U.S. PATENT DOCUMENTS

| | | |
|---|---|---|
| 2008/0162803 A1 | 7/2008 | Masuo |
| 2009/0327822 A1 | 12/2009 | Kameda et al. |
| 2010/0011260 A1* | 1/2010 | Nagadomi ............ G06F 11/008 714/704 |
| 2011/0191526 A1 | 8/2011 | Haukness et al. |
| 2011/0252289 A1 | 10/2011 | Patapoutian et al. |
| 2012/0023365 A1* | 1/2012 | Byom ................... G06F 11/073 714/6.13 |
| 2012/0144145 A1 | 6/2012 | Shin |
| 2012/0216085 A1 | 8/2012 | Weingarten et al. |
| 2012/0239858 A1 | 9/2012 | Melik-Martirosian |
| 2016/0188231 A1* | 6/2016 | Mittelholzer ......... G06F 3/0619 714/704 |

FOREIGN PATENT DOCUMENTS

| | | |
|---|---|---|
| CN | 101535967 A | 9/2009 |
| CN | 101740110 A | 6/2010 |
| CN | 103019969 A | 4/2013 |
| CN | 103678150 A | 3/2014 |

\* cited by examiner

```
┌─────────────────────────────────────────────────────────────────────┐
│ When an operation needs to be performed on a data block in a solid  │
│ state disk, determine a latency of the data block to-be-operated    │
│ according to a load balancing table of the solid state disk, where  │     101
│ the latency is a time duration for performing the operation on the  │
│ data block, and the operation includes an erase operation or a      │
│ write operation                                                     │
└─────────────────────────────────────────────────────────────────────┘
                                    │
                                    ▼
┌─────────────────────────────────────────────────────────────────────┐
│ Determine whether the latency of the data block is greater than a   │
│ warning value, where the warning value is less than a typical       │     102
│ latency, and the typical latency is a preset latency indicating an  │
│ operation on a data block in the solid state disk fails             │
└─────────────────────────────────────────────────────────────────────┘
                                    │
                                    ▼
┌─────────────────────────────────────────────────────────────────────┐
│ If the latency of the data block is greater than the warning value, │     103
│ prohibit performing the operation on the data block                 │
└─────────────────────────────────────────────────────────────────────┘
```

FIG. 1

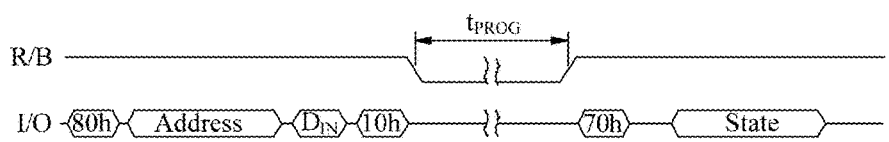

FIG. 2A

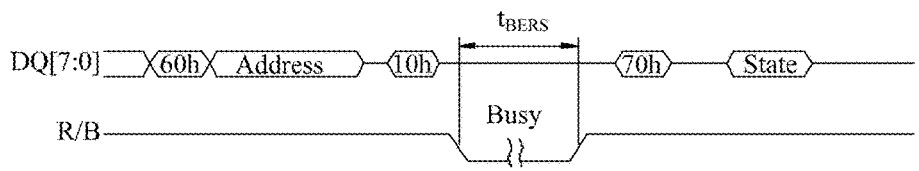

FIG. 2B

SOLID STATE DISK USING METHOD AND APPARATUS

CROSS-REFERENCE TO RELATED APPLICATIONS

This application is a continuation of International Application No. PCT/CN2014/081976, filed on Jul. 10, 2014, which claims priority to Chinese Patent Application No. 201310718063.6, filed on Dec. 23, 2013, both of which are hereby incorporated by reference in their entireties.

TECHNICAL FIELD

Embodiments of the present invention relate to the field of storage technologies, and in particular, to a solid state disk using method and apparatus.

BACKGROUND

Most solid state disks (SSD) are implemented by means of a non-volatile random access storage medium, namely, a NAND flash, where NAND Flashes may be classified into a single level cell (SLC) and a multi-level cell (MLC). The NAND Flash is usually formed by an internal memory and a storage matrix. The storage matrix includes a plurality of blocks, each Block includes a plurality of pages, and each Page further includes a plurality of bytes. Currently, NAND Flashes on the market mostly use MLC chips, and operations on a NAND Flash mainly are read, write, and erase. Read and write is performed on the NAND Flash in a unit of page, and erase is performed in a unit of block. Before a write operation is performed, an erase operation should be performed on a page, and in an erase and write process, an insulation layer of a floating-gate transistor inside the NAND Flash may be damaged. When the erase operation fails, the NAND Flash may actively send a report to the SSD, so that the SSD sets a Block, an operation on which fails, to a bad block. As a quantity of times of erase and write (which is also referred to as a PE Cycle) on the NAND Flash increases, when a percentage of a quantity of bad blocks reaches a threshold, for example, 3%, it is considered that a service life of the NAND Flash ends.

In order to avoid that the service life of the SSD is shortened because bad blocks occur when frequent erase and write operations are performed on some hotspot Blocks, a load balancing technology is introduced in the prior art, and a balancing table is used to record a quantity of times of erase and write on each Block. Each time data is written, an operation is performed preferentially on a Block having a smaller quantity of times of erase and write, thereby ensuring that quantities of times of erase and write of Blocks in the entire SSD are on a same level, that is, the quantities of times of erase and write of Blocks are balanced as much as possible. In addition, some redundant Blocks in the SSD are used as reserved blocks, and when a bad block occurs, a reserved block is used to replace the failed Block, thereby avoiding that the entire SSD expires too early, and extending the service life of the SSD.

Assuming that the SSD has 32000 Blocks, when data is written, the 32000 Blocks are selected evenly, thereby ensuring that quantities of times of erase and write of the blocks are approximate, for example, data write is completed by means of 32000×3K times of operations. However, different Blocks have different service lives. In a data write process, if some Blocks become bad blocks before 3K times of write are performed, the redundant Blocks are used to replace the bad blocks. When the redundant Blocks are used up, the service life of the SSD ends.

SUMMARY

Embodiments of the present invention provide a solid state disk using method and apparatus, so as to reduce production of bad blocks by means of load balancing, thereby reducing use of reserved blocks, and finally achieving an objective of extending a service life of a solid state disk.

According to a first aspect, an embodiment of the present invention provides a solid state disk using method, including:

when an operation needs to be performed on a data block in a solid state disk, determining a latency of the data block to-be-operated according to a load balancing table of the solid state disk, where the latency is a time duration for performing the operation, and the operation includes an erase operation or a write operation;

determining whether the latency of the data block is greater than a warning value, where the warning value is less than a typical latency, and the typical latency is a preset latency when an operation on a data block in the solid state disk fails; and if the latency of the data block is greater than the warning value, prohibiting performing the operation on the data block.

In a first possible implementation manner of the first aspect, the method further includes:

if the latency of the data block is not greater than the warning value, performing the operation on the data block.

With reference to the first possible implementation manner of the first aspect, in a second possible implementation manner of the first aspect, after the performing the operation on the data block, the method further includes:

obtaining a latency of the data block in a process of the operation; and updating the latency of the data block in the load balancing table according to the obtained latency.

With reference to first aspect, the first possible implementation manner, or the second possible implementation manner of the first aspect, in a third possible implementation manner of the first aspect, after the prohibiting performing the operation on the data block, the method further includes:

recording the data block in a preset potential bad block table, where the potential bad block table is used to indicate a data block on which operations need to be reduced.

According to a second aspect, an embodiment of the present invention provides a solid state disk using method, including:

determining a data block to-be-operated according to a load balancing table of a solid state disk;

performing an operation on the data block, where the operation includes an erase operation or a write operation;

recording, in the load balancing table, a latency of the data block in a process of the operation, where the latency is a time duration for performing the operation on the data block;

determining whether the latency of the data block is greater than a warning value, where the warning value is less than a typical latency, and the typical latency is a preset latency when an operation on a data block in the solid state disk fails; and if the latency of the data block is greater than the warning value, recording the data block in a preset potential bad block table.

According to a third aspect, an embodiment of the present invention provides a solid state disk using apparatus, including:

a determining module, configured to: when an operation needs to be performed on a data block in a solid state disk, determine a latency of the data block according to a load balancing table of the solid state disk, where the latency is a time duration for performing the operation on the data block, and the operation includes an erase operation or a write operation;

a judging module, configured to determine whether the latency, determined by the determining module, of the data block is greater than a warning value, where the warning value is less than a typical latency, and the typical latency is a preset latency when an operation on a data block in the solid state disk fails; and a processing module, configured to: if the judging module determines that the latency of the data block is greater than the warning value, prohibit performing the operation on the data block.

In a first possible implementation manner of the third aspect, the processing module is further configured to: if the judging module determines that the latency of the data block is greater than the warning value, perform the operation on the data block.

With reference to the first possible implementation manner of the third aspect, in a second possible implementation manner of the third aspect, the apparatus further includes:

an acquisition module, configured to obtain a latency of the data block in a process of the operation; and an updating module, configured to update the latency of the data block in the load balancing table according to the latency obtained by the acquisition module.

With reference to third aspect, the first possible implementation manner, or the second possible implementation manner of the third aspect, in a third possible implementation manner of the third aspect, the apparatus further includes:

a recording module, configured to: after the operation prohibiting module prohibits performing the operation on the data block, record the data block in a preset potential bad block table, where the potential bad block table is used to indicate a data block on which operations need to be reduced.

According to a fourth aspect, an embodiment of the present invention provides a solid state disk using apparatus, including:

a selecting module, configured to determine a data block according to a load balancing table of a solid state disk;

an operating module, configured to perform an operation on the data block determined by the determining module, where the operation includes an erase operation or a write operation;

a recording module, configured to record, in the load balancing table, a latency of the data block in a process of the operation, where the latency is a time duration for performing the operation on the data block; and a judging module, configured to determine whether the latency of the data block is greater than a warning value, where the warning value is less than a typical latency, and the typical latency is a preset latency when an operation on a data block in the solid state disk fails, where the recording module is further configured to: if the judging module determines that the latency of the data block is greater than the warning value, record the data block in a preset potential bad block table.

In the solid state disk using method and apparatus provided in the embodiments of the present invention, a current latency of each Block is compared with a warning value, a latency of an actually operated Block is dynamically monitored, and when the current latency is less than or equal to the warning value, an operation is performed on the Block. By means of the method in the embodiments of the present invention, load balancing is achieved from the perspective of the physical property of the Block in the SSD, thereby reducing a quantity of bad blocks to some extent, and further prolonging the service life of the SSD.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 1 is a flowchart of Embodiment 1 of a solid state disk using method according to the present invention;

FIG. 2A is a schematic diagram of a programming operation on a solid state disk according to the present invention;

FIG. 2B is a schematic diagram of an erase operation of a solid state disk according to the present invention;

DESCRIPTION OF EMBODIMENTS

Figure 3:
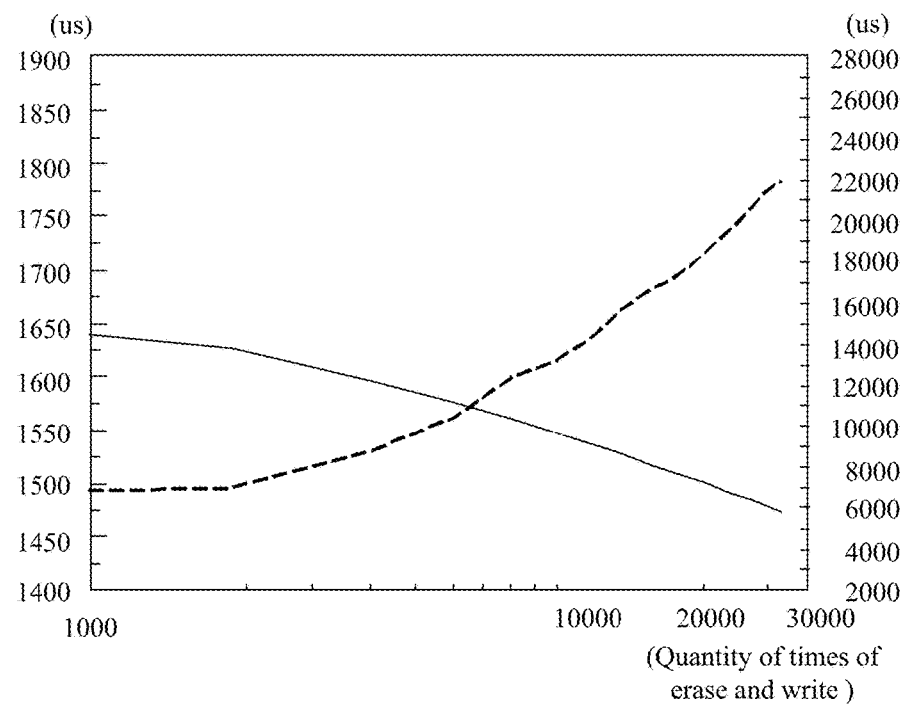
FIG. 3 is a schematic diagram of the erase and write property of a solid state disk according to the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

FIG. 1 is a flowchart of Embodiment 1 of a solid state disk using method according to the present invention. This embodiment is executed by a solid state disk using apparatus, which may be disposed on an SSD, or may be an SSD itself, and is applicable to a scenario in which load of Blocks in the SSD needs to be balanced. Specifically, this embodiment includes the following steps:

101: When an operation needs to be performed on a data block in a solid state disk, determine a latency of the data block to-be-operated according to a load balancing table of the solid state disk, where the latency is a time duration for performing the operation on the data block, and the operation includes an erase operation or a write operation.

An address, a command, and a data input/output (I/O) port of a NAND Flash are multiplexed, and a data read and write process is relatively complex. Generally, each time after an operation command is sent to a data block to-be-operated in the SSD, such as an erase operation command, or a write operation command, the solid state disk using apparatus needs to wait for a time period for performing the operation. For example, for an erase operation, the solid state disk using apparatus needs to wait for a time period for performing the erase operation on the data block; for a write operation, the solid state disk using apparatus needs to wait for a time period for writing data into the data block. Then, a query command can be sent, so as to determine whether the erase operation or the write operation is performed successfully, to finally complete the operation on the data block. The time needing to be waited for is referred to as a latency. The erase operation and the write operation are briefly referred to as an erase and write operation. It is found by means of verification that a latency of each block changes regularly with changes of a quantity of times of erase and write, where the latency is a parameter that truly reflects a health status of a Block physically.

In this embodiment of the present invention, the load balancing table records a latency of each Block, and for a specific data block, the solid state disk using apparatus searches the load balancing table to acquire a latency of the data block.

102: Determine whether the latency of the data block is greater than a warning value, where the warning value is less than a typical latency, and the typical latency is a preset latency indicating an operation on a data block in the solid state disk fails.

For each data block, when a latency reaches some degree, if erase and write are further performed on the Block, the erase and write may fail. In this embodiment, statistics may be collected in advance on a latency of each failed erase and write block in a sampling solid state disk, to obtain a typical latency. For example, a smallest latency in the latencies of all the failed erase and write blocks is used as the typical latency, and the warning value is less than the typical latency; or, an average value of latencies of all or some failed erase and write blocks is used as the typical latency, and the warning value is less than the typical latency; or, the typical latency is obtained by means of statistics collection according to another rule, and the warning value is set.

103: If the latency of the data block is greater than the warning value, prohibit performing the operation on the data block.

The solid state disk using apparatus determines, according to a relationship between the latency and the warning value determined in step 102, whether to continue to perform the operation on the data block.

Specifically, if the current latency of the block is greater than the warning value, it indicates that the service life of the data block is relatively short, that is, a quantity of times of erase and write that can be borne by the data block is relatively small, and erase and write may fail if the operation is further performed on the data block. In this case, even if the quantity of times of erase and write of the data block is far less than a quantity of times of erase and write of another block, the erase operation and the write operation on the data block are prohibited.

Optionally, if the latency of the data block to-be-operated is not greater than the warning value, it indicates that the service life of the data block to-be-operated is relatively long, that is, a quantity of times of erase and write that can be borne by the data block to-be-operated is relatively large, and the erase and write operation can be performed on the data block, that is, the erase operation and the write operation can be performed.

Optionally, in this embodiment, for a data block to-be-operated whose latency is greater than the warning value, after prohibiting performing an operation on the data block, the solid state disk using apparatus may also record the data block to-be-operated in a preset potential bad block table, where the potential bad block table is used to indicate a data block on which erase and write operations need to be reduced. For example, in this embodiment of the present invention, a potential bad block table may be set, where a format of the potential bad block table is the same as a format of a bad block table used to record a bad block, that is, 1 to 2 bits of each block indicate whether the block can be used normally or can be used preferentially, for example, 00 indicates a good block, 01 indicates a bad block, and 10 indicates a type of a potential bad block. In addition, a current erase latency is recorded according to the set warning value in a process of performing erase and write on the block; and when the current erase latency reaches the warning value, the block is not used temporarily, and the block is added to the potential bad block table. For a block added to the potential bad block table, an erase and write operation is not performed on the block temporarily or a quantity of times of erase and write operations on the block is reduced, so as to avoid that the block becomes a bad block in a short time; however, this does not affect a read operation on the block.

It should be noted that, the block recorded in the potential bad block table is not a truly bad data block, but is a data block that may become a bad data block easily if operations are further performed on the data block. A block whose latency is greater than the warning value is recorded in the potential bad block table, which reduces or pauses erase operations or write operations on the block, thereby reducing a probability of occurrence of bad blocks to some extent.

Optionally, in Embodiment 1, after performing an operation on the data block, the solid state disk using apparatus obtains a latency of the data block in a process of the operation, and updates the latency of the data block in the load balancing table according to the obtained latency.

Specifically, to record a current latency of each block in the load balancing table, for each specific data block, each time after an operation is completed, a latency of the data block in a process of the operation is acquired, and the acquired latency is used to update the load balancing table. For example, the latency of the data block before the operation is performed is 2 ms, and the latency of the data block in a process of the operation is 3 ms; then, the latency of the data block in the load balancing table may be updated to 3 ms. In other words, after the current operation is performed on the data block, the latency of the data block in the load balancing table may be updated according to the latency of the data block in a process of the current operation.

Optionally, in Embodiment 1, before it is determined whether the latency of the data block to-be-operated is greater than the warning value, changing features of a quantity of erase and write times of the solid state disk and the latency may be obtained by means of statistics collection, so as to determine the warning value. Generally, the latency includes an erase latency tBERS and a write latency tPROG. For specific details, refer to FIG. 2A and FIG. 2B.

FIG. 2A is a schematic diagram of a programming operation on a solid state disk according to the present invention. An address, a command, and a data I/O path of a solid state disk based on a NAND flash are multiplexed. A process of programming a page, that is, a process of a write operation is as follows: first send a write operation command (for example "0*80") of one clock period, then send a write address of five clock periods, and then, send data. After the data is sent, a write operation command (for example "0*10") of one clock period is sent to indicate that the data has been sent, and after a time period, a query state is entered to determine whether the data is written successfully. If the data is not written successfully, data needs to be written again. In this process, the time period that is waited for is referred to as a write latency (tPROG).

FIG. 2B is a schematic diagram of an erase operation of a solid state disk according to the present invention. Similarly, an address, a command, and a data I/O path of a solid state disk based on a NAND flash are multiplexed. A process of programming a page, that is, a process of an erase operation is as follows: first send an erase operation command (for example "0*60") of one clock period; send an erase address of three clock periods; send an erase operation command (for example "0*D0") of one clock period; after a time period, enter a query state to determine whether data is erased successfully, where if the data is not erased successfully, it indicates that the erase operation fails, and the operating block needs to be set to a bad block. In this process, the time period that is waited for is an erase latency (tBERS).

Generally, the erase latency tBERS and the write latency tPROG may change with an increase of a quantity of times of erase and write. For specific details, refer to FIG. 3.

FIG. 3 is a schematic diagram of the erase and write property of a solid state disk according to the present invention. Referring to FIG. 3, the horizontal coordinate axis show a quantity of times of erase and write, the vertical coordinate axis in the left shows a change value of an erase latency, and a unit is us (microsecond), the vertical coordinate axis in the right shows a change value of a write latency, and a unit is us; the dashed line is a change curve of the erase latency changing with the quantity of times of erase and write, and the solid line is a change curve of the write latency changing with the quantity of times of erase and write. As the quantity of times of erase and write increases, a threshold voltage of the solid state disk may change. As can be known from FIG. 3, when the threshold voltage reaches some degree, an erase failure or a write failure may occur, which corresponds to data that can be directly measured, that is, the erase latency tBERS and the write latency tPROG may change as the quantity of times of erase and write increases.

It is found by means of verification that, a change relationship between the quantity of times of erase and write of the solid state disk and the erase latency presents a regularity. The following describes the present invention in details by using a relationship between an erase latency and a quantity of times of erase and write as an example. For specific details, refer to FIG. 4A and FIG. 4B.

Figure 4A:
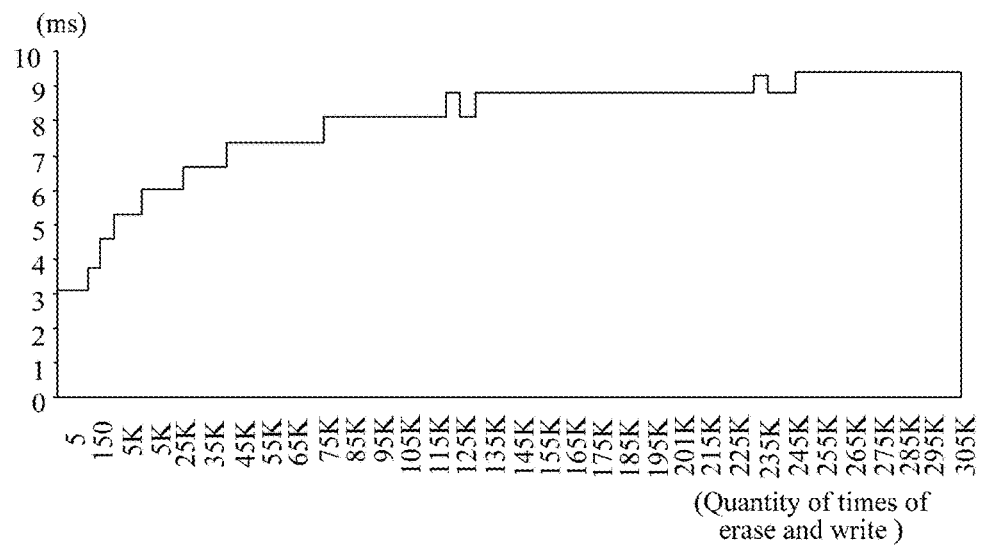
FIG. 4A is a schematic curve graph of a relationship between an erase latency tBERS and a quantity of times of erase and write of an MLC-based solid state disk.
Figure 4B:
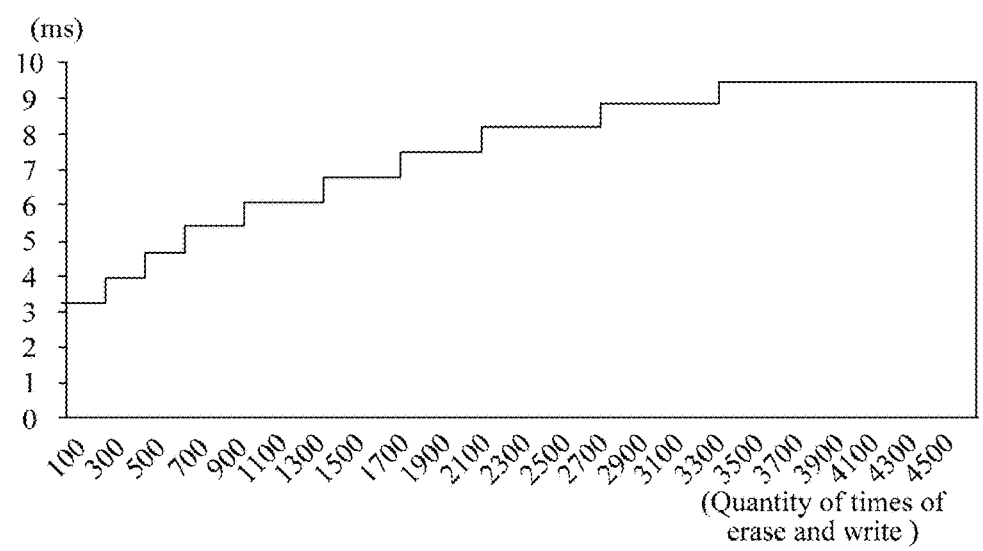
FIG. 4B is a schematic curve graph of a relationship between an erase latency tBERS and a quantity of times of erase and write of an SLC-based solid state disk.

FIG. 4A is a schematic curve graph of a relationship between an erase latency tBERS of an MLC-based solid state disk and a quantity of times of erase and write according to the present invention; FIG. 4B is a schematic curve graph of a relationship between an erase latency tBERS of an SLC-based solid state disk and a quantity of times of erase and write according to the present invention.

Referring to FIG. 4A and FIG. 4B, the horizontal coordinates show a quantity of times of erase and write, the vertical coordinates in the left show a change value of an erase latency, and a unit is ms (millisecond). The erase latency tBERS may change as the quantity of times of erase and write increases, and present a regularity; the regularity of the erase latency tBERS may increase as the quantity of times of erase and write increases; and when an erase latency tBERS of a block is large to some extent, erase on the block may fail.

Similarly, using a write latency as an example: the regularity of the write latency tPROG may decrease as the quantity of times of erase and write increases, and when an erase latency tPROG of a block decreases to some extent, write on the block may fail.

To sum up, in a process of determining a warning value, a feature how a quantity of times of erase and write of a solid state disk changes with a latency is obtained by means of statistics collection, an erase latency tBERS of an actually operated block or a write latency tPROG of a page is dynamically monitored, a warning value is set, and multiple thresholds less than the warning value are set according to the warning value. When an erase latency tBERS or a write latency tPROG reaches a corresponding set threshold, different processings are performed (for example, decreasing use frequency or the block is not used temporarily), and the block is shielded temporarily before it expires, thereby reducing consumption of reserved blocks. That is, blocks having different quality are identified in a dynamic predetermining manner, so as to reduce use of blocks having poor quality, thereby prolonging the service life of the solid state disk on the whole. The following describes the present invention in detail by using an example in which a warning value is determined according to a changing relationship between a quantity of times of erase and write and an erase latency.

Figure 5:
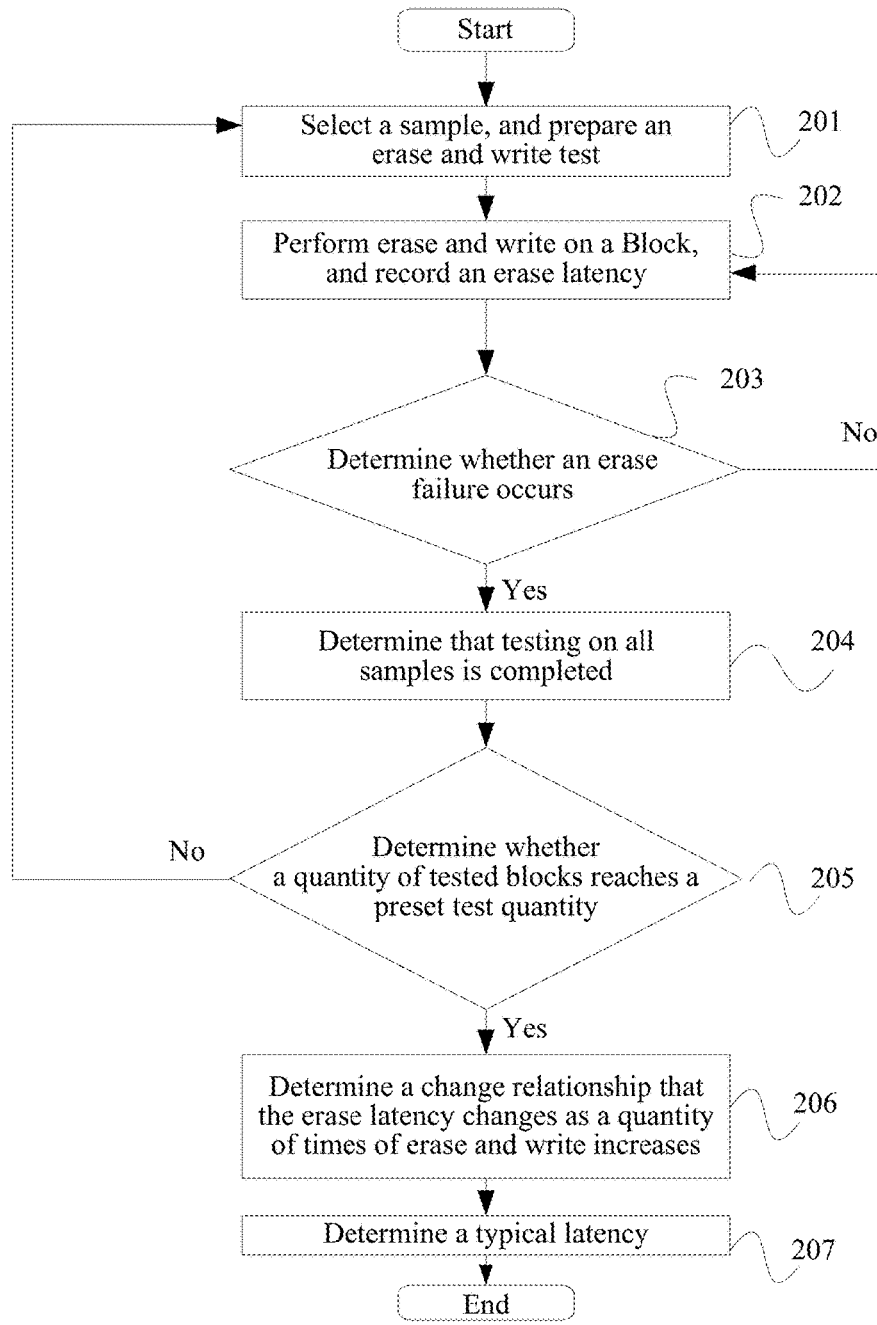
FIG. 5 is a flowchart of determining a warning value in a solid state disk using method according to the present invention.

FIG. 5 is a flowchart of determining a warning value in a solid state disk using method according to the present invention. As shown in FIG. 5, this embodiment includes the following steps:

201: Select a sample, and prepare an erase and write test.

A certain quantity of NAND Flashes of some model and of a new batch are selected as samples, and erase and write tests are prepared, to test a latency obtained when erase and write on each block fail.

202: Perform erase and write on a block, and record an erase latency.

Each time the erase and write are performed, an erase latency of the block is recorded.

203: Determine whether an erase failure occurs.

204: Determine that testing on all samples is completed.

205: Determine whether a quantity of tested NAND Flashes reaches a preset test quantity.

206: Determine a changing relationship that the erase latency changes as a quantity of times of erase and read increases.

Figure 6:
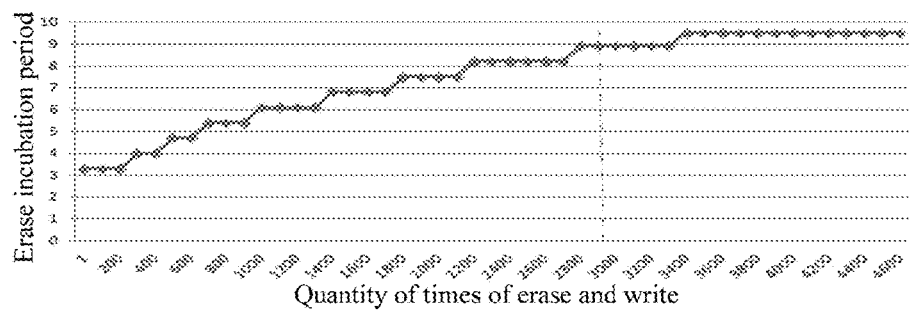
FIG. 6 is a schematic diagram of a change relationship between a quantity of times of erase and write and an erase latency according to an embodiment of the present invention.

Specifically, referring to FIG. 6, FIG. 6 is a schematic diagram of a changing relationship between a quantity of times of erase and write and an erase latency in this embodiment of the present invention, where the horizontal coordinates show a quantity of times of erase and write, and the vertical coordinates show the erase latency (tBERS). As shown in FIG. 6, when the quantity of times of erase and write is 1 to 200, the erase latency is about 3 ms; when the quantity of times of erase and write is 200 to 400, the erase latency is about 4 ms; when the quantity of times of erase and write is 400 to 600, the erase latency is about 5 ms; . . . ; and when the quantity of times of erase and write is greater than 3400, the erase latency is about 10 ms.

207: Determine a typical latency.

If a change of the latency with the quantity of times of erase and write is less than a preset value, it is determined that the erase latency is the typical latency. For example, referring to FIG. 6, when the quantity of times of erase and write is greater than 3400, the latency basically remains 10 ms and no longer changes, and then 10 ms may be selected as the typical latency, and 9 ms is set as the warning value. Reaching the warning value means that the block will become a bad block soon if the block is still used.

Further, in Embodiment 1, multiple levels of thresholds may be set according to the warning value, to grade blocks based on reliability, where each threshold is less than the warning value. In this case, for each threshold, an operation is performed, according to the threshold, on a block whose current latency is less than or equal to the threshold in a load balancing table, so that the blocks reach the threshold at the same time.

Specifically, referring to FIG. 3, according to requirements, a first level of threshold may be set to 6 ms, a second level of threshold may be set to 7 ms, a third level of threshold may be set to 8 ms, and a fourth level of threshold may be set to 9 ms. When an erase and write operation is performed initially, an operation may be performed on any block randomly; when a latency of a data block is about to reach the first level of threshold, it is avoided that an operation is performed on the data block, and an operation is performed on another block, so that the blocks all reach the first level of threshold. After the blocks all reach the first level of threshold, on the premise that it is ensured that the latencies are less than the second level of threshold, an operation may be performed on the blocks randomly, and so on, to ensure that load balancing is performed on the blocks according to the threshold, so as to increase the service life of an SSD. In this process, if a bad block occurs, no operation is performed on the block, for example, when the blocks all reach the third level of threshold, if a random operation causes a block to be a bad block, in this case, on the premise that it is ensured that the latencies are less than the fourth level of threshold, an operation may be performed on the other blocks randomly. In addition, for all levels of thresholds, different operation manners may be set, for example, when a latency of a data block is less than the first threshold, an erase and write operation may be performed on the data block randomly; when the latency of the data block is between the first level of threshold and the second level of threshold, erase and write operations on the data block may be reduced; when the latency of the data block is greater than the second level of threshold, an operation on the data block may be paused.

It should be noted that, the process is: setting multiple levels of thresholds, to grade the blocks based on reliability, so that different processings are performed when blocks of different quality reach different thresholds. In an actual implementation manner, multiple levels of thresholds may be set so that different processings are performed when pages of different quality reach different thresholds, thereby implementing fine management on blocks.

Figure 7:
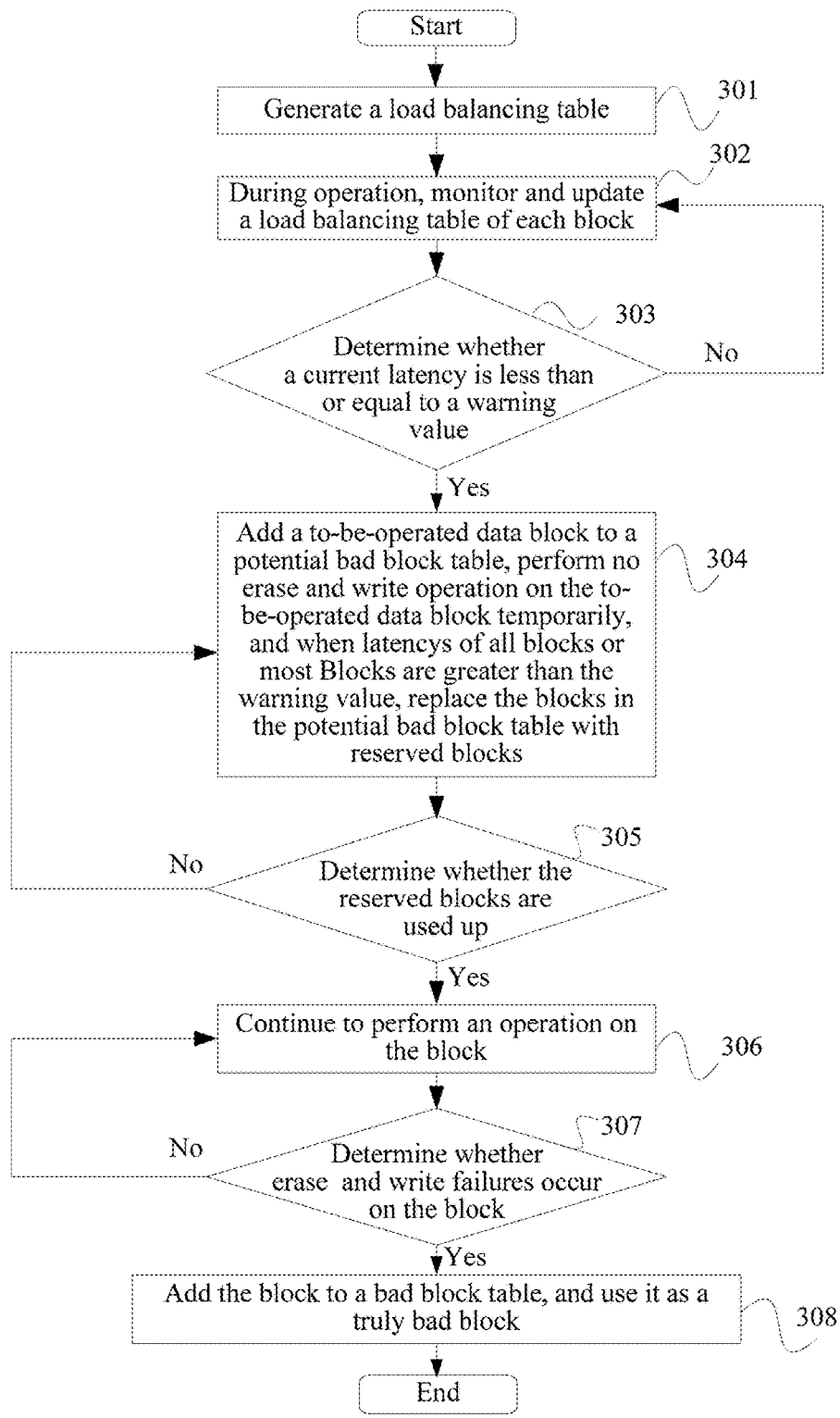
FIG. 7 is a flowchart of performing load balancing according to a warning value in the solid state disk using method according to the present invention.

FIG. 7 is a flowchart of performing load balancing according to a warning value in the solid state disk using method according to the present invention. As shown in FIG. 7, this embodiment includes the following steps:

301: Generate a load balancing table.

In this step, an initial latency of each block is recorded.

302: During operation, monitor and update a load balancing table of each block.

In a process of performing erase and write on a block, a current latency of each block is monitored, and the current latency is updated to the load balancing table. For example, if an initial latency of a block before an erase operation is 3 ms, if an erase operation is performed on block1, and the latency of the block after the one hundredth time of erase operation is changed to 4 ms, the latency in the load balancing table is updated to 4 ms after the one hundredth time of erase operation.

303: Determine whether the current latency is less than or equal to a warning value.

For a specific data block, each time after an erase and write operation is performed, a latency of the data block is compared with the warning value, so that load balancing between blocks is implemented with reference to the load balancing table, that is, if the current latency is less than or equal to the warning value, step 302 is performed; otherwise, step 304 is performed.

304: Add a data block to-be-operated to a potential bad block table, perform no erase and write operation on the data block to-be-operated temporarily, and when latencies of all blocks or most blocks are greater than the warning value, replace the blocks in the potential bad block table with reserved blocks.

It should be noted that, for a block added to the potential bad block table, an erase and write operation is not performed on the block temporarily or a quantity of times of erase and write operations on the block is reduced, so as to avoid that the block becomes a bad block in a short time; however, this does not affect a read operation on the block.

305: Determine whether the reserved blocks are used up.

During design of the SSD, some redundant blocks may be reserved as reserved blocks, for example, a raw capacity of a 100 G SSG may be 128 G, where the 28 G may be used for the reserved blocks. The SSD determines whether the reserved blocks are used up, and if the reserved blocks are not used up, step 304 is performed; otherwise, if the reserved blocks are used up, step 306 is performed.

306: Continue to perform an operation on the block.

If the reserved blocks are used up, an operation is further performed on a block in the potential bad block table.

307: Determine whether erase and write failures occur on the block.

In a process of continuing the operation, it is determined whether erase and write failures occur on a currently operated block in the potential bad block table; if the failures do not occur, step 306 is performed; otherwise, if the failures occur, step 308 is performed.

308: Add the block to a bad block table, and use it as a truly bad block.

Figure 8:
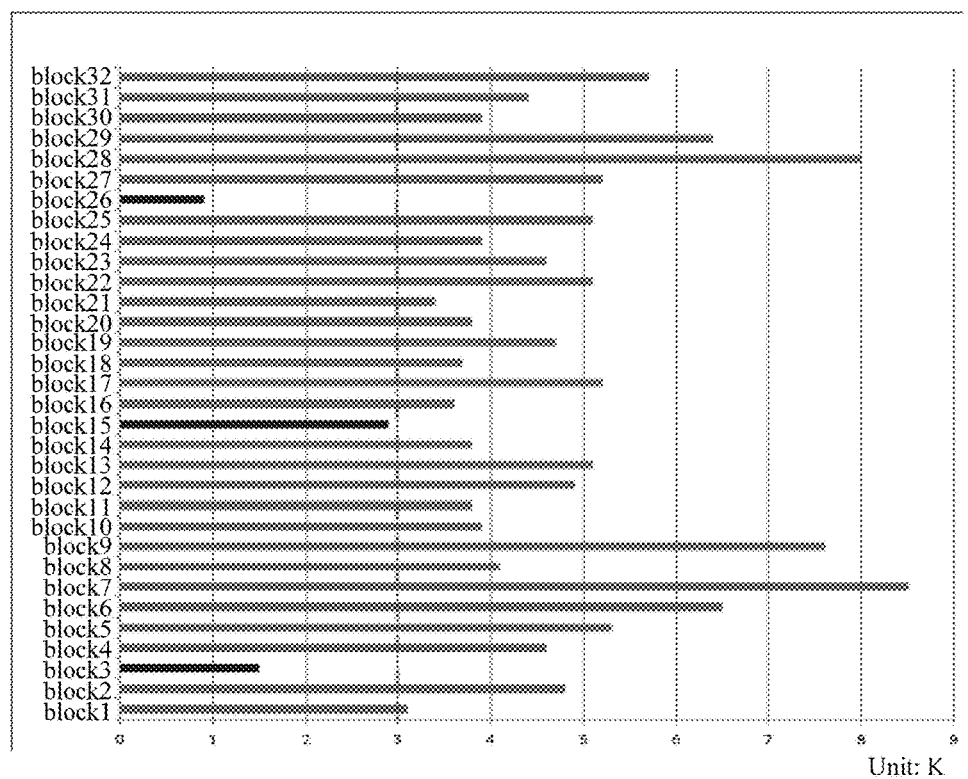
FIG. 8 is a diagram of a use status of a solid state disk according to an embodiment of the present invention.

In the solid state disk using method provided in this embodiment of the present invention, a latency of a data block to-be-operated is compared with a warning value, the latency of the data block to-be-operated is dynamically monitored, and an operation on a block whose latency is greater than the warning value is prohibited, thereby achieving real load balancing from the perspective of physical property, reducing production of bad blocks to some extent, using reserved blocks as much as possible, and prolonging the service life of the SSD. For example, as shown in FIG. 8, FIG. 8 is a diagram of a use status of a solid state disk according to this embodiment of the present invention. The horizontal coordinates are used to indicate a quantity of times of erase and write that can be actually borne by each block, and the vertical coordinates are used to indicate a block in the SSD. A maximum quantity of times of erase and write that can be actually borne by block1 is about 3.2K, a maximum quantity of times of erase and write that can be actually borne by block2 is about 4.8K, and a maximum quantity of times of erase and write that can be actually borne by block3 is 1.5K, and so on. In the prior art, to ensure load balancing between blocks, a same quantity of times of erase and write may be performed on blocks evenly. According to this manner, if a quantity of times of erase and write on each block reaches 3K, block3, block15, and block26 may become bad blocks. However, in the method provided in this embodiment, load balancing between blocks is not implemented according to a quantity of times of erase and write of each block, but load balancing is implemented according to a relationship between a current latency of each block and a warning value, thereby increasing the service life of the SSD. For example, if the warning value is 9 ms, after 1.2K times of erase and write are performed on block3, if erase and write are further performed on block3, the latency may be greater than 9 ms; in this case, erase and write on block3 are paused; after 1.2K times of erase and write are performed on block4, if erase and write are further performed on block4, it may not be caused that the latency is greater than 9 ms, and therefore, erase and write can still be performed on block4. As can be known from the foregoing descriptions, by using the method provided in this embodiment of the present invention, real load balancing can be achieved from the perspective of physical property of blocks, thereby decreasing a quantity of bad blocks to some extent, and further prolonging the service life of the SSD.

Figure 9:
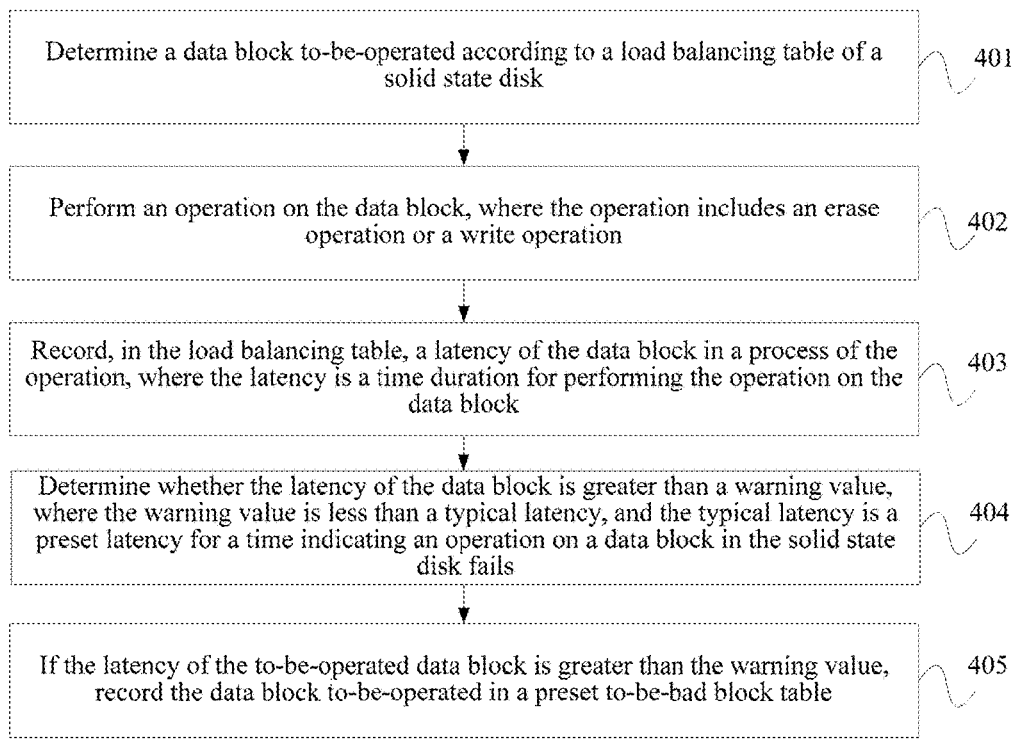
FIG. 9 is a flowchart of Embodiment 2 of a solid state disk using method according to the present invention.

FIG. 9 is a flowchart of Embodiment 2 of a solid state disk using method according to the present invention. Compared with the embodiment shown in FIG. 1, in this embodiment, before performing an operation on each block, a solid state disk using apparatus first determines a data block to-be-operated according to a load balancing table. Specifically, this embodiment includes the following steps:

401: Determine a data block to-be-operated according to a load balancing table of a solid state disk.

In this embodiment, the load balancing table stores a block whose latency is not greater than a warning value. Each time before an erase operation or a write operation needs to be performed, the data block to-be-operated is first determined from the load balancing table. Preferably, a block whose latency is small in the load balancing table may be selected as the data block to-be-operated.

402: Perform an operation on the data block, where the operation includes an erase operation or a write operation.

After the data block is determined, the erase operation or the write operation is performed on the data block.

403: Record, in the load balancing table, a latency of the data block in a process of the operation, where the latency is a time duration for performing the operation on the data block.

To store a current latency of each block in the load balancing table, for each specific data block, each time after an operation is completed, a latency of the data block in a process of the operation is acquired, and the acquired latency is used to update the load balancing table.

404: Determine whether the latency of the data block is greater than a warning value, where the warning value is less than a typical latency, and the typical latency is a preset latency when an operation on a data block in the solid state disk fails.

405: If the latency of the data block to-be-operated is greater than the warning value, record the data block to-be-operated in a preset potential bad block table.

To ensure that all blocks in the load balancing table are operable blocks, that is, ensure that latencies of all blocks in the load balancing table are not greater than the warning value, in this step, for a specific data block, after an operation is completed, the solid state disk using apparatus determines whether a latency of the data block is greater than the warning value; if the latency is greater than the warning value, records the data block in the potential bad block table, and removes it from the load balancing table; otherwise, if the latency of the data block is not greater than the warning value, records, in the load balancing table, a latency of the data block after the operation. For example, in this embodiment of the present invention, a potential bad block table may be set, where a format of the potential bad block table is the same as a format of a bad block table used to record a bad block, that is, 1 to 2 bits of each block indicate whether the block can be used normally or can be used preferentially, for example, 00 indicates a good block, 01 indicates a bad block, and 10 indicates a type of a potential bad block. In addition, a current erase latency is recorded according to the set warning value in a process of performing erase and write on the block; and when the current erase latency reaches the warning value, the block is not used temporarily, and the block is added to the potential bad block table. For a block added to the potential bad block table, an erase and write operation is not performed on the block temporarily or a quantity of times of erase and write operations on the block is reduced, so as to avoid that the block becomes a bad block in a short time; however, this does not affect a read operation on the block.

It should be noted that, in this embodiment, multiple levels of thresholds may also be set according to the warning value, so as to grade blocks based on reliability. Specifically, a feature how a quantity of times of erase and write of a solid state disk changes with a latency is obtained by means of statistics collection, an erase latency tBERS of an actually operated block or a write latency tPROG of a page is dynamically monitored, a warning value is set, and multiple thresholds less than the warning value are set according to the warning value. When an erase latency tBERS or a write latency tPROG reaches a corresponding set threshold, different processings are performed (for example, decreasing use frequency or the block is not used temporarily), and the block is shielded temporarily before it expires, thereby reducing consumption of reserved blocks. That is, blocks having different quality are identified in a dynamic predetermining manner, so as to reduce use of blocks having poor quality, thereby prolonging the service life of the solid state disk on the whole.

In the solid state disk using method provided in this embodiment of the present invention, before an operation is performed, a data block whose latency is less than a warning value is determined and used as a data block to-be-operated, and the operation is performed on the data block, a latency of the data block to-be-operated is dynamically monitored, and an operation on a block whose latency is greater than the warning value is prohibited, thereby achieving real load balancing from the perspective of physical property, reducing production of bad blocks to some extent, using reserved blocks as much as possible, and prolonging the service life of the SSD.

Figure 10:
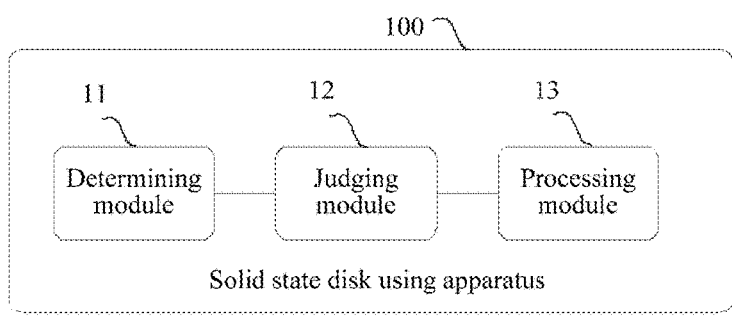
FIG. 10 is a schematic structural diagram of Embodiment 1 of a solid state disk using apparatus according to the present invention.

FIG. 10 is a schematic structural diagram of Embodiment 1 of a solid state disk using apparatus according to the present invention. The solid state disk using apparatus provided in this embodiment is an apparatus corresponding to the embodiment of FIG. 1, and a specific implementation process is not described herein again. Specifically, the solid state disk using apparatus 100 provided in this embodiment specifically includes:

a determining module 11, configured to: when an operation needs to be performed on a data block in a solid state disk, determine a latency of the data block according to a load balancing table of the solid state disk, where the latency is a time duration for performing the operation on the data block, and the operation includes an erase operation or a write operation;

a judging module 12, configured to determine whether the latency, determined by the determining module 11, of the data block is greater than a warning value, where the warning value is less than a typical latency, and the typical latency is a preset latency when an operation on a data block in the solid state disk fails; and a processing module 13, configured to: if the judging module 12 determines that the latency of the data block is greater than the warning value, prohibit performing an operation on the data block.

In the solid state disk using apparatus provided in this embodiment of the present invention, a latency of a data block to-be-operated is compared with a warning value, the latency of the data block to-be-operated is dynamically monitored, and an operation on a block whose latency is greater than the warning value is prohibited, thereby achieving real load balancing from the perspective of physical property, reducing production of bad blocks to some extent, using reserved blocks as much as possible, and prolonging the service life of the SSD.

Optionally, the processing module 13 is further configured to: if the judging module 12 determines that the latency of the data block is not greater than the warning value, perform an operation on the data block.

Figure 11:
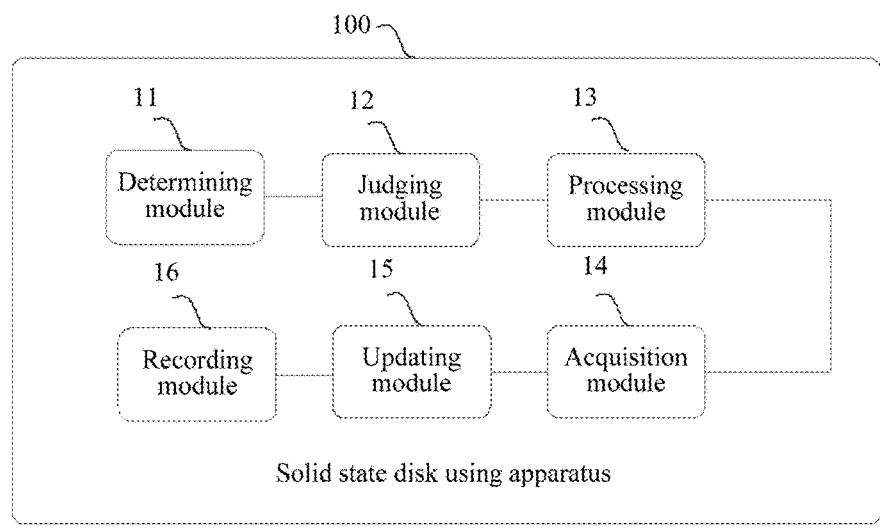
FIG. 11 is a schematic structural diagram of Embodiment 2 of a solid state disk using apparatus according to the present invention.

FIG. 11 is a schematic structural diagram of Embodiment 2 of a solid state disk using apparatus according to the present invention. As shown in FIG. 11, based on the apparatus shown in FIG. 10, the solid state disk using apparatus provided in this embodiment further includes:

an acquisition module 14, configured to obtain a latency of the data block in a process of the operation; and an updating module 15, configured to update the latency of the data block in the load balancing table according to the latency obtained by the acquisition module 14.

Referring to FIG. 11, the solid state disk using apparatus further includes:

a recording module 16, configured to: after the operation prohibiting module prohibits performing the operation on the data block, record the data block in a preset potential bad block table, where the potential bad block table is used to indicate a data block on which operations need to be reduced.

Figure 12:
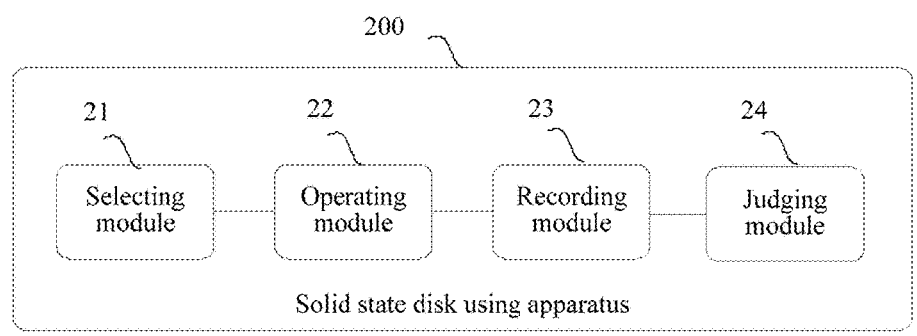
FIG. 12 is a schematic structural diagram of Embodiment 3 of a solid state disk using apparatus according to the present invention.

FIG. 12 is a schematic structural diagram of Embodiment 3 of a solid state disk using apparatus according to the present invention. The solid state disk using apparatus provided in this embodiment is an apparatus embodiment corresponding to the embodiment of FIG. 9, and a specific implementation process is not described herein again. Specifically, the solid state disk using apparatus 200 provided in this embodiment specifically includes:

a selecting module 21, configured to determine a data block according to a load balancing table of a solid state disk;

an operating module 22, configured to perform an operation on the data block determined by the determining module, where the operation includes an erase operation or a write operation;

a recording module 23, configured to record, in the load balancing table, a latency of the data block in a process of the operation, where the latency is a time duration for performing the operation on the data block; and a judging module 24, configured to determine whether the latency of the data block is greater than a warning value, where the warning value is less than a typical latency, and the typical latency is a preset latency indicating an operation on a data block in the solid state disk fails; where the recording module 23 is further configured to: if the judging module 24 determines that the latency of the data block is greater than the warning value, record the data block in a preset potential bad block table.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method of using a solid state disk, wherein a load balancing table for recording latencies of data blocks of the solid state disk is preset for the solid state disk, and the method comprises:

randomly selecting a data block in the solid state disk;

determining a latency of the randomly selected data block according to the load balancing table, wherein the latency is a time duration for performing an operation, and the operation comprises an erase operation or a write operation; and determining a data block to-be-operated in the solid state disk for performing the operation according to the latency of the randomly selected data block and multiple latency thresholds, wherein the multiple latency thresholds represent an ascending series of thresholds, wherein the determining the data block to-be-operated in the solid state disk for performing the operation comprises:
    determining whether a latency of the randomly selected data block reaches a current level of threshold of the multiple latency thresholds;
    selecting the randomly selected data block as the data block to-be-operated when the latency of the selected data block is less than the current level of threshold;
    randomly selecting another data block as the randomly selected data block when the latency of the selected data block is equal to or greater than the current level of threshold; and
    continuing to determine the data block to-be-operated in the solid state disk for performing the operation.

2. The method according to claim 1, wherein after the step of determining the latency of the randomly selected data block, the method further comprises updating the latency of the operated data block in the load balancing table according to the obtained latency.

3. The method according to claim 1, wherein the determining the data block to-be-operated in the solid state disk for performing the operation further comprises:
    when a latency of substantially all data blocks of the solid state disk reaches the current level of threshold, assigning a next level of threshold larger than the current level of threshold as a new current level of threshold.

4. The method of claim 1, further comprising:
    determining whether the latency of the randomly selected data block is greater than a warning value, wherein the warning value succeeds the multiple latency thresholds; and
    prohibiting performing the operation on the randomly selected data block when the latency of the selected data block is greater than the warning value.

5. The method according to claim 4, wherein after the step of prohibiting performing the operation on the randomly selected data block, the method further comprises:
    recording the data block to-be-operated in a preset potential bad block table, wherein the potential bad block table is used to record a data block on which operations need to be reduced.

6. A solid state disk using method, comprising:
    selecting a data block to perform an operation according to latencies of data blocks of the solid state disk in a load balancing table of a solid state disk;
    performing the operation on the data block, wherein the operation comprises an erase operation or a write operation;
    recording, in the load balancing table, a latency of the operated data block after the operation is performed, wherein the latency is a time duration for performing the operation on the data block;
    determining whether the latency of the operated data block is greater than a warning value, wherein the warning value is less than a typical latency, and the typical latency is a preset latency indicating a data block in the solid state disk fails to be operated; and
    recording the operated data block in a preset potential bad block table if the latency of the operated data block is greater than the warning value,
    wherein multiple latency thresholds precede the warning value, and the multiple latency thresholds represent an ascending series of thresholds that, when the latency of the operated data block exceeds an individual latency threshold, represents a degradation in the latency of the operated data block,
    wherein selection of the data block to perform the operation is done according to the multiple latency thresholds and the load balancing table of a solid state disk,
    wherein the selection of the data block to perform the operation according to the multiple latency thresholds and the load balancing table of a solid state disk comprises:
    determining a data block to-be-operated in the solid state disk for performing the operation according to the latency of the data block to-be-operated and multiple latency thresholds, and
    wherein the determining the data block to-be-operated in the solid state disk for performing the operation comprises:
        randomly selecting a test data block in the solid state disk;
        determining whether a latency of the test data block reaches a current level of threshold of the multiple latency thresholds;
        selecting the test data block as the data block to perform the operation when the latency of the test data block is less than the current level of threshold; and
        randomly selecting another data block as the test data block when the latency of the test data block is equal to or greater than the current level of threshold; and
        continuing to determine the data block to perform the operation in the solid state disk.

7. The method of claim 6, wherein the determining the data block to-be-operated in the solid state disk for performing the operation further comprises:
    when a latency of substantially all data blocks of the solid state disk reaches the current level of threshold, assigning a next level of threshold larger than the current level of threshold as a new current level of threshold.

8. A solid state disk presets a load balancing table for recording latencies of data blocks of the solid state disk, the solid state disk comprising:
    a processor; and
    a non-transitory computer-readable storage medium coupled to the processor and storing programming instructions for execution by the processor, the programming instructions instruct the processor for:
    randomly selecting a data block in the solid state disk;
    determining a latency of the randomly selected data block according to the load balancing table, wherein the latency is a time duration for performing an operation, and the operation comprises an erase operation or a write operation; and
    determining a data block to-be-operated in the solid state disk for performing the operation according to the latency of the random selected data block and multiple latency thresholds, wherein the multiple latency thresholds represent an ascending series of thresholds,
    wherein the determining the data block to-be-operated in the solid state disk for performing the operation comprises:
        determining whether a latency of the randomly selected data block reaches a current level of threshold of the multiple latency thresholds;
        selecting the randomly selected data block as the data block to-be-operated when the latency of the selected data block is less than the current level of threshold;
        randomly selecting another data block as the randomly selected data block when the latency of the selected data block is equal to or greater than the current level of threshold; and continuing to determine the data block to-be-operated in the solid state disk for performing the operation.

9. The solid state disk according to claim 8, wherein after performing the operation on the data block, the processor is further instructed to:
   obtain a latency of the operated data block; and
   update the latency of the operated data block in the load balancing table according to the obtained latency.

10. The solid state disk of claim 8, wherein the determination of the data block to-be-operated in the solid state disk for performing the operation further comprises:
    when a latency of substantially all data blocks of the solid state disk reaches the current level of threshold, assigning a next level of threshold larger than the current level of threshold as a new current level of threshold.

11. The solid state disk of claim 8, wherein the non-transitory computer readable storage medium contains further instructions that when executed by the processor, configured the processor for:
    determining whether the latency of the randomly selected data block is greater than a warning value, wherein the warning value succeeds the multiple latency thresholds; and
    prohibiting performing the operation on the randomly selected data block when the latency of the selected data block is greater than the warning value.

12. The solid state disk according to claim 11, wherein after prohibiting performing the operation on the data block, the processor is configured for:
    recording the data block in a preset potential bad block table, wherein the potential bad block table is used to record a data block on which operations need to be reduced.

* * * * *